United States Patent Office 3,549,384
Patented Dec. 22, 1970

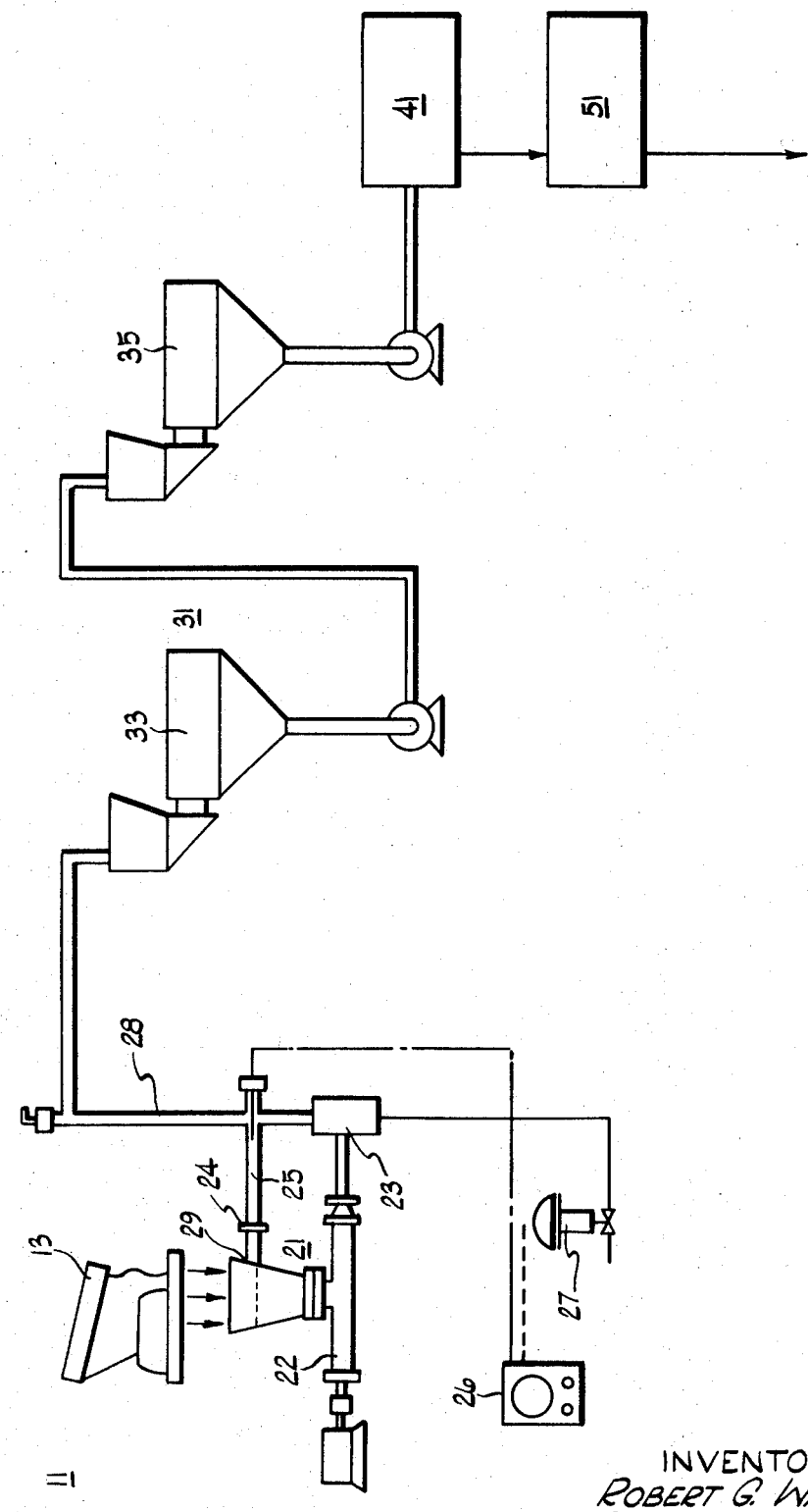

3,549,384
TOMATO PRODUCT AND METHOD
OF MAKING SAME
Robert G. Walker, Glenview, and George Bosy, Park Ridge, Ill., assignors to Kraftco Corporation, New York, N.Y., a corporation of Delaware
Filed July 18, 1967, Ser. No. 654,169
Int. Cl. A23l 1/00, 1/22
U.S. Cl. 99—100                         8 Claims

ABSTRACT OF THE DISCLOSURE

Preparing tomatoes for the manufacture of catsup by breaking fresh whole tomatoes into particulate tomato solids and heating the surface of the particulate tomatoes within 10 seconds to a temperature sufficient to inactivate pectin-splitting enzymes thereon and thereafter completely heating the tomatoes within a time sufficiently short so that breakdown of the total pectin by enzymatic activity is minimized. Heating is preferably effected by contacting a flowing stream of the particulate tomato solids with sanitary steam.

---

The present invention generally relates to a tomato product and more particularly it relates to the preparation of an improved tomato catsup.

Catsup is the condiment produced from one or more of the following ingredients: (1) a liquid tomato dispersion obtained from ripe tomatoes of red or reddish variety, (2) a liquid tomato dispersion obtained as a by-product from preparing tomatoes for canning, consisting of peelings and cores, and (3) a liquid tomato dispersion obtained as a by-product from partial extraction of juice from tomatoes. Such tomato dispersions are obtained by straining the tomatoes or by-products, with or without heating, so as to remove skin, seeds, cores and other coarse or hard substances. When such liquid tomato dispersion is obtained without heating, the process is generally referred to as a "cold break" process. When a heating process is utilized, the process is known as a "hot break." The hot break process is generally desirable in that the tomato dispersion can be produced without breakdown of the pectin by enzymatic activity. The presence of pectin is desirable to provide proper texture and thickening properties in the catsup product. After straining, the liquid dispersion is concentrated and is then seasoned with sugar, salt, vinegar and spices. The mixture of concentrated liquid tomato dispersion and the other ingredients are cooked so as to pasteurize the dispersion. The cooked mixture is then sealed in a container. The mixture is heat-treated either before or after sealing, so as to prevent spoilage.

A common practice for the manufacture of tomato catsup is to prepare the catsup from fresh tomatoes during the harvest season. A concentrated tomato dispersion, commonly referred to as tomato paste, may be prepared during the harvest season and stored and subsequently used to produce tomato catsup. However, catsup made from tomato paste is not economically desirable, except for use in portion-controlled packaging, because of the excessive tomato solids required to yield a product of suitable consistency. Also, since catsup prepared from tomato paste is undesirably subjected to additional heating, the color and taste are never the same as for catsup made from fresh tomatoes.

In a conventional method of manufacture of catsup from fresh tomatoes, hot break tomato pulp is concentrated by boiling in open tanks, equipped with steam coils, to about 14.2% solids. To retain color, the pulp is desirably cooked as quickly as possible which requires approximately one-half hour of open boiling. Usually, half of the tomato pulp is added to the open kettle and is brought to a boil with the balance added slowly, so as not to check the boiling. Next the concentrated tomato pulp is removed into finishing kettles where the remaining catsup ingredients, such as vinegar, sugar, salt and spices are added and the mixture is boiled to the desired consistency or total solids. The catsup is finally de-aerated and hot filled.

Such conventional method of catsup manufacture has numerous disadvantages. The mixture of catsup ingredients tends to bake on the inside kettle wall during boiling and thus retards heat transfer. The boil and re-boil procedure for cooking the catsup ingredients results in flavor loss through evaporation. Also boiling, cooking, and re-heating the catsup through a heat exchanger coupled with excessive re-circulation of the catsup product tends to cause separation of the catsup during storage in the container and possibly requires more tomato solids than if the process were less heat abusive.

Accordingly, it is the principal object of the present invention to provide an improved method of manufacturing tomato catsup. It is another object of the present invention to provide an improved method of heating tomato solids to inactivate pectinase. It is a particular object of the present invention to prepare fresh whole tomatoes for the manufacture of tomato catsup which minimizes breakdown of pectin by enzyme activity.

Further objects and advantages of the invention will be apparent from the study of the detailed description and the single drawing which is a schematic flow sheet illustrating various features of the process of the present invention.

In general, a process in accordance with the present invention includes the steps of breaking whole tomatoes and heating the broken tomatoes so as to inactivate pectin splitting enzymes by direct contact of the broken tomatoes with sanitary steam. By "breaking" is meant any process wherein the whole tomatoes are coarsely chopped, sliced, crushed, or otherwise separated into coarse fragments. In this connection, it is believed that the action of the pectinase enzyme is so rapid that some pectin damage will result even at ambient temperatures if the whole tomatoes are pulverized beyond a point necessary to aid in heat transfer.

After contacting the broken tomatoes with steam the hot break tomato pulp may then be pulverized and finished to the desired particle size and subsequently concentrated by evaporation. The concentrated dispersion of tomato solids is then treated to provide catsup by mixing the dispersion of tomato solids with other catsup ingredients and subsequent heat treatment. A preferred method for treating the concentrated dispersion of tomato solids to provide catsup is described in co-pending application Ser. No. 551,095, now Pat. No. 3,399,064.

A system which may be used for production of tomato catsup in accordance with this invention is illustrated in the drawing. The system comprises a tomato breaking section 11, a heat treating section 21, a tomato solids finishing section 31, a pulp concentration section 41, a finishing section 51 and various pumps, valves and controls as will be described more fully hereinafter.

The tomato breaking section 11 comprises a suitable machine for slicing or otherwise breaking whole tomatoes into particulate material, one suitable machine being a hammermill used without a screen. Heat treatment section 21 comprises a suitable pump 22 for handling particulate solids, heating means 23, a throttling valve 24, a by-pass return line 25, an automatic controller 26, a control valve 27 and a 'feed line 28. A suitable pump for handling particulate tomato solids is a Moyno open throat pump. The finishing section 31 comprises a pulping machine 33 and a finishing machine 35. Suitable machines for pulping and finishing are rotary mills provided with screens through which the tomato solids are forced but which screen out seeds and stems. The pulping machine is provided with a screen with openings from about .040″ to about .070″ while the screen of the finishing machine has openings from about .020″ to about .035″.

The pulp concentration section 41 comprises any suitable vacuum evaporative equipment whereby the single strength tomato juice obtained from the finishing machine may be concentrated to about 23 percent by weight tomato solids. The finishing section 51 comprises suitable equipment for blending the concentrated mixture of tomato solids obtained from the pulp concentration section 41 with necessary tomato catsup ingredients and suitable equipment for heating the mixture of catsup ingredients, pumping the mixture and putting the mixture into suitable containers. As mentioned above, a preferred method for finishing the concentrated dispersion of tomato solids into catsup is disclosed in co-pending application Ser. No. 551,095, now Pat. No. 3,899,064.

In operation the tomatoes are first broken by the hammermill 13 operated without a screen. This provides broken tomatoes of relatively large particle size which are subsequently further macerated during pumping and heating steps, as will be explained more fully hereinafter.

After being broken the tomatoes are loaded immediately into a hopper 29 connected to the inlet throat of the pump 22. The flowing stream of broken particulate tomatoes are then directly heated while being pumped through the feed line 28 so as to heat the tomato solids rapidly to a temperature sufficient to inactivate pectinase enzyme. This temperature is about 190° F.

In this connection as heretofore stated, enzymatic breakdown of pectin by pectinase begins to occur as soon as the skin of the tomato is broken. The rate of enzymatic breakdown is directly proportional to both the particle size of the broken tomatoes and their temperature. In this connection the pectinase enzyme is contained within individual cells of the tomato while the pectin is located exterior to the area bounded by the cell wall. As the particle size is reduced, more individual cells are broken to release pectinase, while at the same time more pectin is made available for the pectinase to react with. Breakdown of pectin by pectinase thus begins to occur immediately at any cut surface of the tomatoes where cells have been broken. Similarly, as the temperature of the broken tomatoes is increased up to that temperature where the pectinase enzyme is inactivated, the rate of enzyme breakdown of pectin is increased.

In this connection, while the tomatoes may be held for very brief periods of time at ambient temperatures after being broken, depending on the particle size, it is desirable to begin heating as shortly after breaking as is possible. It is therefore preferred to introduce the tomatoes directly into the heating means 23 after being broken.

As stated above, after heating of the broken tomatoes is initiated, the time for reaching a temperature of about 190° F. before any substantial breakdown of pectin occurs is dependent on the particle size to which the tomatoes have been broken. In this connection it should be understood that the inactivation temperature for pectinase need be reached rapidly only at those places in the broken tomatoes where cell walls have been ruptured, i.e., at the exposed cut surface of the tomatoes. Thus, while the surface temperature of the particulate tomatoes must be increased to a temperature of at least about 190° F. to inactivate pectinase, the internal temperature may remain at a lower level without any substantial breakdown of pectin occurring. In general the surface temperature of the particulate tomatoes should be increased to the inactivation temperature for pectinase within a time of about 10 seconds.

The heating means 23 may be any suitable apparatus which is capable of heating the broken tomatoes to a temperature of about 190° F. within the desired time. For reasons of economy and simplicity, a preferred means for heating the broken tomatoes is by direct injection of sanitary steam into the flowing stream of broken tomatoes.

Steam, when directly injected into the flowing stream of broken tomatoes, is regulated to provide sufficient heat based on the amount of flow of tomato solids by the regulating valve 27 and the automatic temperature controller 26. A by-pass return line 25 is provided to divert part of the hot-break pulp which has been heated back to the hopper. This permits immediate heating of the surface of the particulate tomatoes to a temperature of substantially about 190° F. This prevents enzymatic breakdown of pectin released at the cut surface. The subsequent heat treatment of the flowing stream of particulate tomatoes increases the temperature of the whole mass of particulate tomatoes to a temperature of at least about 190° F. This provides a heated cushion of particulate tomato solids into which the whole broken tomatoes may be introduced prior to introduction into the pump 22. The capacity of the pump is such that the flow of freshly broken tomato solids and partially returned heated tomato solids requires a holdup time of no longer than about 30 seconds before being heated by steam injection. The throttling valve 24 is used to provide a slight back pressure against which the pump may work.

The heated particulate tomato solids are then passed to a rotary screen pulping mill 33 where the particle size of the tomato solids is reduced to from about .040″ to about .070″ and the seeds and stems are removed. The resultant tomato pulp is then pumped to another similar mill 35 where the solids are finished to final particle size through a screen having openings of from about .020″ to about .035″. The resultant single strength tomato juice, which is stripped of seeds and stems, is then pumped to the pulp concentration section.

If desired, the tomato juice from the finishing mill may be flash cooled and chilled for storage prior to concentration to the desired level of tomato solids. Concentration to the desired level of tomato solids may be effected by any suitable vacuum evaporation equipment which is capable of providing 26 to 27 inches of vacuum and a product exit temperature of 110 to 120° F. In this connection, it is not possible to store a concentrated dispersion of tomato solids due to bacteriological spoilage. However, if the concentrated dispersion of tomato solids is combined with the vinegar and salt required for subsequent production of tomato catsup, the dispersion may be stored under refrigeration conditions with exclusion of air until required for subsequent use.

In the finishing section, in accordance with the preferred method of co-pending application Ser. No. 551,095, the concentrated dispersion of tomato solids is mixed with the required ingredients to provide tomato catsup in a blending tank. The mixture of tomato catsup ingredients is then contacted with steam to heat the mixture to at least about 150° F. prior to packing. The catsup may be flash cooled from about 10° F. to about 40° F. prior to packing to deaerate.

The following example further illustrates various features of the present invention and is intended in no way to restrict the scope of the invention which is defined in the appended claims.

A batch of catsup was prepared using the system of the drawing, according to the following formula.

| Ingredient: | Weight percent |
| --- | --- |
| Concentrated tomato pulp (23% solids) | 70.248 |
| Sugar, granulated | 15.920 |
| Water (condensate) | 5.930 |
| White vinegar | 4.612 |
| Salt | 2.960 |
| Spices | 0.330 |

The catsup is prepared according to the following procedure.

Tomatoes from crates were dumped into a water filled trough and were washed clean from soil and sorted.

The temperature of the wash water was 110° F. Approximately 2,000 pounds per hour of sorted and cleaned tomatoes were processed through a hammermill operated without screens at room temperature. The whole tomatoes were cut into particulate tomato sections by passage through the hammermill. The particulate totatoes were then loaded directly into a hopper located above the entrance to the open throat type SSQ 2½" Moyno pump. The Moyno pump was used to transfer the particulate tomatoes through a pipe containing a nozzle whereby steam was injected directly into the tomatoes to provide a temperature of 205° F. Part of the heated tomatoes which are mixed with excess steam were then re-circulated back to the hopper as other particulate tomatoes were received from the hammermill. The non-re-circulated portion of the tomatoes was pumped directly to a rotary pulping machine. The tomatoes were passed through a .060" screen in the pulping machine wherein the major portion of the seeds and other undesirable tomato portions were removed.

After passing through the pulping machine, the resultant tomato juice was passed through another rotary pulping machine used as a finisher. The finisher was provided with a .027" screen. After leaving the finishing machine, the single strength tomato juice was concentrated directly to 23 percent total solids in a falling film vacuum evaporator. A concentrated dispersion of tomato solids was discharged from the evaporator at a solids level of 23 percent at 110° F. The sugar, vinegar, salt and spices were then added to the concentrated dispersion of tomato solids in a mixer at a temperature of 110° F. The resultant mixture was then heated directly by steam injection to a temperature of 208° to 212° F. for a hold time of twelve seconds while the mixture of tomato catsup ingredients was flowing through a one inch pipe. The catsup product was then flash cooled to 175° F. in a tank which had been subjected to 15 inches of vacuum to deaerate the catsup product. The catsup was then filled into portion sized flexible containers. The internal temperature of the catsup after packaging was 170° F.

The catsup produced according to the above procedure provided a product with exceptional taste, texture and color. In a direct comparison test with catsup produced by other commercial methods, the color and flavor of the catsup produced by the present invention was outstanding.

Various other features of the invention are set forth in the following claims.

What is claimed is:

1. A process for preparing tomatoes for the manufacture of catsup which comprises in combination the steps of breaking whole tomatoes, immediately heating the surface of said broken tomatoes to a temperature sufficient to inactivate pectinase enzyme thereof by immersing said broken tomatoes in a heated bath of particulate tomatoes, said bath being present at a level sufficient to heat the surface of said broken tomatoes, said immersion of said broken tomatoes in said bath occurring within a time period of at least about ten seconds of said breaking step, transporting said broken tomatoes thereby providing a flowing stream of particulate tomatoes, immediately heating said flowing stream of particulate tomatoes to a predetermined temperature sufficient to completely inactivate pectinase enzyme in the particulate tomatoes, diverting a portion of said flowing stream of pectinase inactivated particulate tomatoes to provide said heated bath of said particulate tomatoes, said heating of said flowing stream of said particulate tomatoes to said predetermined temperatures occurring within about 30 seconds of said breaking step, and recovering the undiverted portion of said pectinase inactivated flowing stream of particulate tomatoes.

2. A process in accordance with claim 1 wherein said second heating step is effected by contacting said flowing stream of broken tomatoes with sanitary steam.

3. A process in accordance with claim 1 wherein said step of breaking whole tomatoes is effected by passing the whole tomatoes through a hammermill operated without a screen.

4. A process in accordance with claim 1 wherein said predetermined temperature is at least about 190° F.

5. A process in accordance with claim 1 wherein said flowing stream of particulate tomatoes is heated to a uniform predetermined temperature of from about 195° F. to about 210° F.

6. The process of claim 1 wherein whole tomatoes are broken beneath the surface of said bath of heated particulate tomatoes.

7. The process of claim 1 wherein said recovered portion of pectinase-inactivated tomatoes is further treated by the steps of finishing to a preselected particle size while removing seeds and stems therefrom, concentrating said finished tomatoes to provide a tomato dispersion of at least about 20 percent by weight of solids, adding catsup ingredients to said concentrated dispersion and heating said mixture of catsup ingredients to a temperature of at least about 150° C. to provide a catsup product.

8. The process of claim 7 wherein said mixture of catsup ingredients is heated by contacting said mixture with sanitary steam.

References Cited

UNITED STATES PATENTS

| | | | |
|---|---|---|---|
| 2,086,338 | 7/1937 | Sodergreen | 99—216 |
| 2,858,226 | 10/1958 | Kaufman | 99—206 |

OTHER REFERENCES

Cruess, 3rd ed., Commercial Fruits & Vegetables, McGraw-Hill Book Co. Inc., New York, 1948, pp. 450–455.

RAYMOND N. JONES, Primary Examiner

J. M. HUNTER, Assistant Examiner

U.S. Cl. X.R.

99—144

UNITED STATES PATENT OFFICE
CERTIFICATE OF CORRECTION

Patent No. 3,549,384                    Dated December 22, 1970

Inventor(s) Robert G. Walker, et al

It is certified that error appears in the above-identified patent and that said Letters Patent are hereby corrected as shown below:

Column 3, line 20 - For "Patent No. 3,899,064" read "Patent No. 3,399,064".

Column 5, line 6 - For "totatoes" read "tomatoes".

Signed and sealed this 6th day of April 1971.

(SEAL)
Attest:

EDWARD M. FLETCHER, JR.              WILLIAM E. SCHUYLER, JR
Attesting Officer                     Commissioner of Patents